Figure 1:
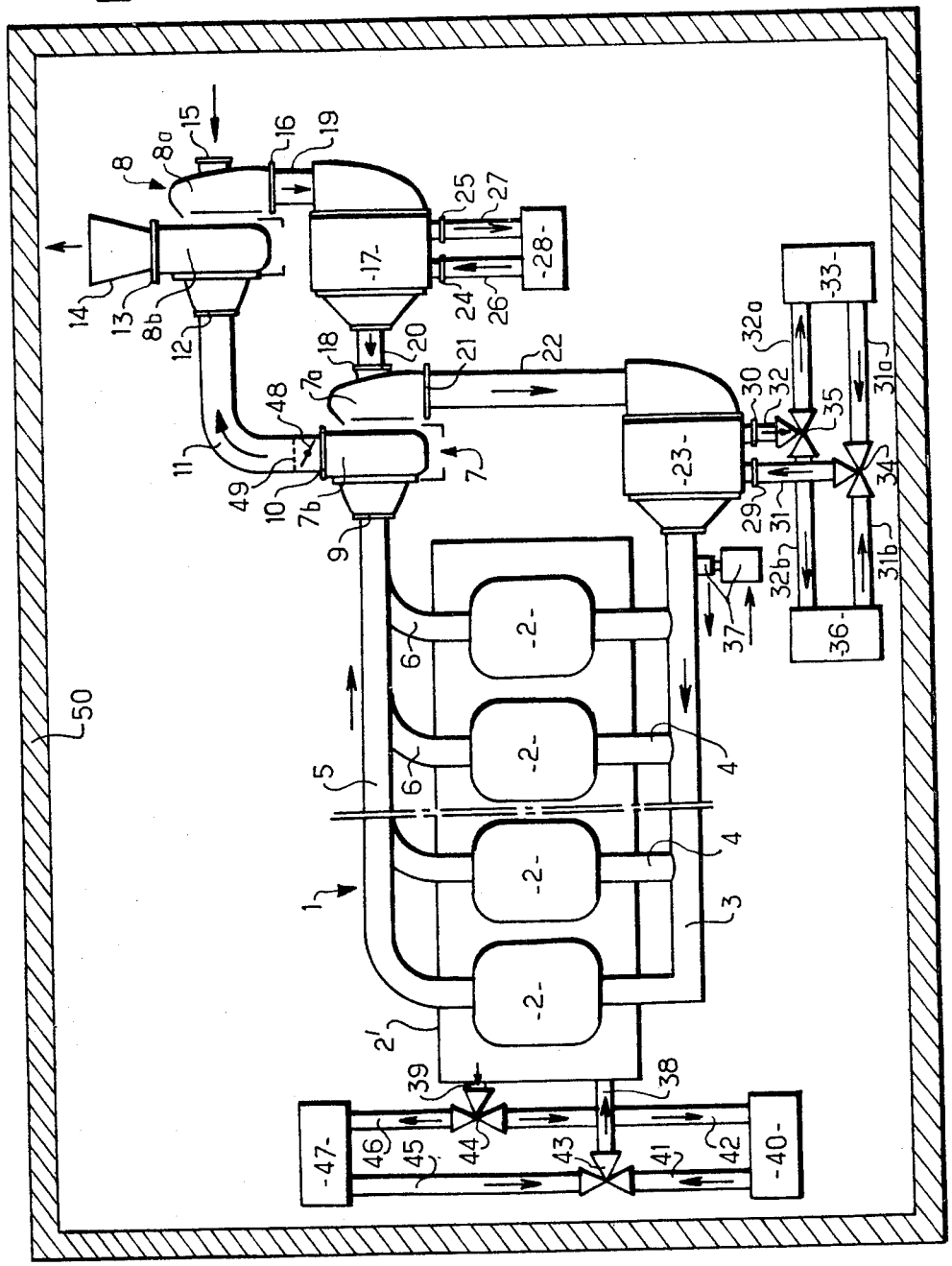

United States Patent

Treuil

[11] 4,096,697
[45] Jun. 27, 1978

[54] METHOD AND MEANS FOR CONDITIONING THE INTAKE AIR OF A SUPERCHARGED, LOW-COMPRESSION RATIO DIESEL ENGINE

[75] Inventor: Bernard Treuil, Paris, France

[73] Assignee: Societe d'Etudes de Machines Thermiques S.E.M.T., Saint Denis, France

[21] Appl. No.: 660,978

[22] Filed: Feb. 24, 1976

Related U.S. Application Data

[63] Continuation-in-part of Ser. No. 484,212, Jun. 28, 1974, Pat. No. 3,977,195.

[30] Foreign Application Priority Data

Feb. 25, 1975   France ........................... 75 05851

[51] Int. Cl.² ........................................... F02B 29/04
[52] U.S. Cl. ................... 60/599; 123/122 D; 123/179 H; 123/179 G; 123/179 L; 60/602
[58] Field of Search ................. 60/599, 602; 123/107, 123/111, 179 H, 179 G, 179 L, 122 D, 119 A

[56] References Cited

U.S. PATENT DOCUMENTS

| | | | |
|---|---|---|---|
| 2,373,139 | 4/1945 | Morris | 60/602 |
| 2,374,708 | 5/1945 | Shoults | 60/602 |
| 2,376,143 | 5/1945 | Edwards | 60/602 |
| 2,480,621 | 8/1949 | Warner | 60/602 |
| 2,491,380 | 12/1949 | Kutzler | 60/602 |
| 2,622,390 | 12/1952 | Newton | 60/599 |
| 3,397,684 | 8/1968 | Scherenberg | 60/599 |
| 3,941,113 | 3/1976 | Baguelin | 123/179 R |
| 3,976,042 | 8/1976 | Baguelin | 123/179 G |

*Primary Examiner*—Ronald H. Lazarus
*Attorney, Agent, or Firm*—Kenyon & Kenyon, Reilly, Carr & Chapin

[57] ABSTRACT

A method of and means for conditioning a substantially highly supercharged, low-compression ratio Diesel engine at start and low-load or idling speed operation wherein the improvement consists in the step of temporarily preheating the air supply before it enters or is pressure fed into the combustion chambers of the engine cylinders.

77 Claims, 2 Drawing Figures

METHOD AND MEANS FOR CONDITIONING THE INTAKE AIR OF A SUPERCHARGED, LOW-COMPRESSION RATIO DIESEL ENGINE

This is a Continuation-in-Part of the copending U.S. Pat. Application Ser. No. 484,212 of June 28, 1974 now U.S. Pat. No. 3,977,195.

The present invention relates generally to and has essentially for its subject matter a method of running an internal combustion engine preferably with reciprocating pistons, in particular of the fuel-injection and compression self-ignition or Diesel type having in particular a relatively low volumetric compression ratio of a magnitude ranging preferably between 8 and 12 and supercharged for example to a substantial extent at a supercharging ratio as high as 5 for instance and in particular a method of at least temporarily conditioning or treating the air supply for said engine at start and/or possibly also at low-load conditions or idling speed operation of the engine as well as means or a device for carrying out such a method. The invention also relates to the various applications and uses resulting or deriving from practicing said improved process and/or working said improved device or means as well as to the systems, assemblies, arrangements, apparatus, machines, contrivances, equipments, installations, stationary appliances or power plants, automotive vehicles and ships of any kind and like constructions provided with such devices.

It is well known in the prior state of the art that for increasing the power of a supercharged Diesel engine, it is possible to increase the pressure of the precompressed intake air supplied by the supercharging system and therefore the weight of combustion-supporting air fed into the engine cylinders hence to correlatively increase the amount of fuel injected for every working cycle of engine operation. The supercharged air is generally delivered by one or several exhaust gas-driven turbo-blowers or like turbine-driven boosters or air compressors discharging into the intake manifold of the engine and consisting generally each one of an air compressor or booster mechanically coupled to a turbine usually driven by the exhaust gases issuing from each exhaust manifold of the engine. It is generally advantageous or necessary to cool the intake air which has thus been heated or warmed through compression by means of at least one final air cooler or aftercooler located between the intake manifold and the last compressor to thereby again increase the weight of air forced into the cylinders for a same displaced volume and at the same time for keeping the temperature during the working cycle of the engine at a suitable level.

For a given volumetric compression ratio of the engine it is however now possible to indefinitely increase the ratio of supercharging, i.e. the ratio of the actual pressure of the precompressed intake air to atmospheric pressure because with highly supercharged engines excessive combustion pressures would result therefrom which would overstress the component elements, members or parts of the engine. To overcome such a drawback one is then led to reduce the volumetric compression ratio of the engine. Such a decrease in the volumetric compression ratio of the engine below a certain limit value of for instance 12 results however in the inconvenience of making difficult the start and operation at low-load conditions in particular at idling speed, i.e. no-load or slow running conditions of the engine because the temperature of the intake air after precompression is not high enough to cause self-ignition of the injected fuel.

One main object of the invention is therefore to remove the aforesaid inconveniences while enabling thereby to increase the rated or maximum power of the supercharged Diesel engine for a given or same piston stroke displacement or swept volume, i.e. cylinder capacity thereof. To solve the technical problems set the invention provides an improved process of running a supercharged low volumetric compression ratio Diesel engine in particular at start and possibly also at low-load or partial load conditions of the engine, and in particular a method of conditioning the air supply whether precompressed or not, said process being characterized by the step consisting in temporarily preheating the air supply or feed before it enters or reaches or is compressed or used to support combustion for burning fuel in the combustion chamber of the engine or prior to fuel injection into the engine cylinders or to fuel being mixed with said air therein. For this purpose, the method according to one embodiment of the invention is characterized in that it consists in selectively braking, reducing, hindering or impeding the flow rate of the exhaust gases in a manner for instance variable or adjustable at will, in particular by selectively generating in a variable manner a prescribed preferably adjustable set head or pressure loss at any of at least one or several locations in their flow path, positioned between, on the one hand, at least one or each engine cylinder and, on the other hand, at least one or each exhaust outlet opening to the atmosphere through which said exhaust gases are exiting to the outside and discharged into the open air. According to a specific aspect of the invention said forced reduction in flow rate or artificial impeding of the gas flow is produced in the flow path of said exhaust gases between at least one or each engine cylinder and its associated exhaust manifold or towards the outlet or downstream end portion or collective exit to the open air of at least one or each exhaust manifold, either before, i.e. upstream of, or after, i.e. downstream of each drive turbine for the air compressor of the supercharging turbo-blower. This reduction of flow rate is thus produced for instance in the affluent gas stream between at least one or each engine cylinder and the confluence or junction point where said affluent stream meets the collective main gas stream flowing in particular in its associated exhaust manifold. Such a pressure or head loss may be obtained for instance by variation and in particular reduction in the cross-section of free passageway of flow of the exhaust gases. This arrangement is advantageous especially at start or during the engine cranking period since it causes a reduction in the emptying or drainage of the engine cylinders so that there remains residual air heated through compression within the cylinders which effects the desired heat contribution or supply to the supercharged air. This reduction in flow rate is removed as soon as the engine has started but it may also be maintained possibly while being modulated continuously depending upon or according to the partial load conditions of the engine through a suitable preferably automatic for instance feed-back control or like follow-up system.

According to a further characterizing feature of the invention, the method comprises the step consisting in temporarily delaying the fuel injection for at least one part of the starting time period of said engine.

According to another characterizing feature of the invention the method consists in cranking said engine for its starting time period by rotating same in particular through mechanical drive by means of its crank-shaft for a small number of working cycles corresponding for instance to ten compressions, i.e. twenty revolutions in the case of a four-stroke engine without injecting any fuel.

According to still a further characterizing feature of the invention the fuel-injection time delay is preferably automatically keyed or phase-locked in substantially follow-up relationship to the instant temperature of the preheated intake air.

According to still another characterizing feature of the process according to the invention and to a further form of embodiment thereof, the preheating step is carried out by selectively injecting and burning fuel into and substantially directly within at least one air intake manifold of the engine for producing hot combustion gases and thus mixing the latter directly with the supercharged air supply fed into and within the intake manifold. The combustion-supporting oxygen content of this gaseous mixture is high enough to effect a reliable ignition within the engine cylinders in particular at the start of the latter and once the engine is running, the aforesaid combustion may be stopped.

In the case of an engine with supercharged or precompressed inlet air normally cooled before its induction by forced-flow circulation of an auxiliary cooling fluid with guided or confined flow and according to still another characterizing feature of the process according to the invention and to a different form of embodiment thereof, the aforementioned preheating step consists in selectively substituting an auxiliary heating medium for the cooling fluid. This arrangement offers the advantage of preheating the air admitted into the cylinders when the effective supercharging pressure is zero or low (at start and during the idling speed condition or slow running period, respectively), whereas this preheating step is discontinued and this air is cooled in a conventional manner when the supercharging pressure is high.

In the case of an aforementioned engine with cylinders cooled by forced-flow circulation of an auxiliary coolant with guided or confined flow and according to still another characterizing feature of the process of the invention forming still another embodiment thereof, the aforesaid preheating step consists in selectively replacing said coolant by an auxiliary heating fluid. This arrangement exhibits the advantage of enabling the preheating of the engine proper before its start by using its own normal cooling circuit. As soon as the engine has begun to work and has become warm, the circulation of heating fluid may be stopped and the cooling circuit put again into normal operation.

Finally according to an additional characterizing feature of the process according to the invention and to a different form of embodiment thereof, the aforementioned preheating step consists in selectively confining and heating the ambient air of the environment where the engine is located, so as to thereby convey and transmit heat to the engine in particular through convection before its start. Once the engine is running and warm, such a heating of the outer atmosphere is discontinued.

These various embodiments of the method according to the invention together with their modifications and alternatives may of course be used either separately or independently of each other or in any possible conbinations with each other. According to an additional characterizing feature of the method of the invention, the preheating step is keyed or phase-locked preferably in an automatic manner and follow-up relationship through servo-control or like feedback means with the instant operating conditions of the engine so as to vary the temperature of the supercharged air possibly in a substantially continuous manner as the inverse ratio of the instantaneous load or rotational speed of the engine and posssibly as a function of the pressure of this air. Thus the invention advantageously provides automatic control for constantly keeping the air admitted into the engine cylinders at a temperature ranging between a minimum temperature enabling the ignition of the injected fuel at the end of the compression stroke when the engine is operating at reduced power and a maximum temperature allowing a suitable feed with air when the engine operates at full power or load at the maximum supercharging pressure.

The invention relates also to a device for carrying out the aforesaid process in particular in the case of an engine supercharged by at least one exhaust gas driven turbo-blower set, which is characterized by the provision of means for at least temporarily preheating the air supply before it enters or reaches or is compressed or used to support combustion for burning fuel in the combustion chambers of the engine or prior to fuel injection into the engine cylinders or to the fuel being mixed with said air. An embodiment of the device according to the invention is characterized by at least one selectively adjustable control member for variably braking or reducing the flow rate of the exhaust gases, positioned at any location in at least one duct or pipe-line connecting at least one or each engine cylinder to at least one or each outlet opening to the outside through which said exhaust gases are exiting or discharged to the open air. Thus according to an examplary aspect of the invention one aforesaid selectively adjustable member is positioned either within at least one or each branch-pipe connecting at least one or each engine cylinder to its associated exhaust manifold or at some point towards the downstream collective egress end portion, opening to the atmosphere, of at least one or each exhaust manifold either before or after one or each turbine driving the air booster compressor of one supercharging turbo-blower set.

According to a further characterizing feature of the invention, the device is characterized by selectively adjustable and possibly automatic or self-acting means for delaying the fuel injection.

According to another characterizing feature of the device of the invention the latter comprises preferably automatic control means for operating or triggering in time-delayed relationship the fuel injection keyed or phase-locked in follow-up relationship for instance to the instant temperature of the air contained within one or each engine cylinder.

In the case of the aforementioned engine possibly provided at least with aftercooler means for the supercharged air and according to another characterizing feature of the device of the invention and to a different embodiment thereof, at least one fuel burner means is mounted on at least one intake manifold at a position located between the upstream end or inlet portion thereof and some point towards and preferably in the vicinity or on the side of the outlet of said aftercooler means.

In the case of an aforesaid engine supercharged by at least one blowing turbo-compressor set at least with after-cooler means for the supercharging air, the inner coolant piping of which, within the heat exchanger forming said aftercooler means, is connected in series in the circuit of a cold source of cooling fluid and according to still a further characterizing feature of the device of the invention and to another embodiment thereof, a circuit of a hot source of heating fluid is branched off across said piping in by-passing relationship through the medium of selectively controllable switching valve means for successively connecting said piping in series to or disconnecting same from said circuit of hot source of heating fluid.

In the case of an aforesaid engine comprising a fluid coolant circuit for cooling the engine cylinders and according to still another characterizing feature of the device of the invention and to a different form of embodiment thereof, said fluid coolant circuit comprises selectively controllable or actuated switching valve means connected to a circuit of a hot source of heating fluid for successively putting said cooling fluid circuit in direct communication through series connection with said circuit of said hot source of heating fluid or disconnecting same from the latter.

Finally in accordance with an additional characterizing feature of the device of the invention and according to an additional embodiment thereof, there is provided an enclosure surrounding or containing said engine and fitted with means for heating or receiving and introducing hot air into said enclosure.

The aforementioned various forms of embodiment may of course be used either separately, i.e. independently of each other or in any possible combinations with each other. Moreover, according to a further characterizing feature of the device of the invention, the latter comprises means for keying or phase-locking in a preferably automatic manner the operating members for controlling and adjusting or regulating the preheating means for the supercharging air to the actual operating or instant working conditions of said engine in follow-up relationship. These automatic servo-control means may be associated or combined with each one of the aforementioned forms of embodiment of the device according to the invention.

The invention relates also to the new industrial product consisting of the supercharged low-compression ratio Diesel engine provided with at least one aforesaid device.

Owing to its technical advantages and its constructional simplicity the invention brings about a significant progress, technical advance or improvement over the known prior state of the art and is of economical manufacture. Moreover, it is very efficient and effective while exhibiting a high reliability or dependability.

Figure 2:
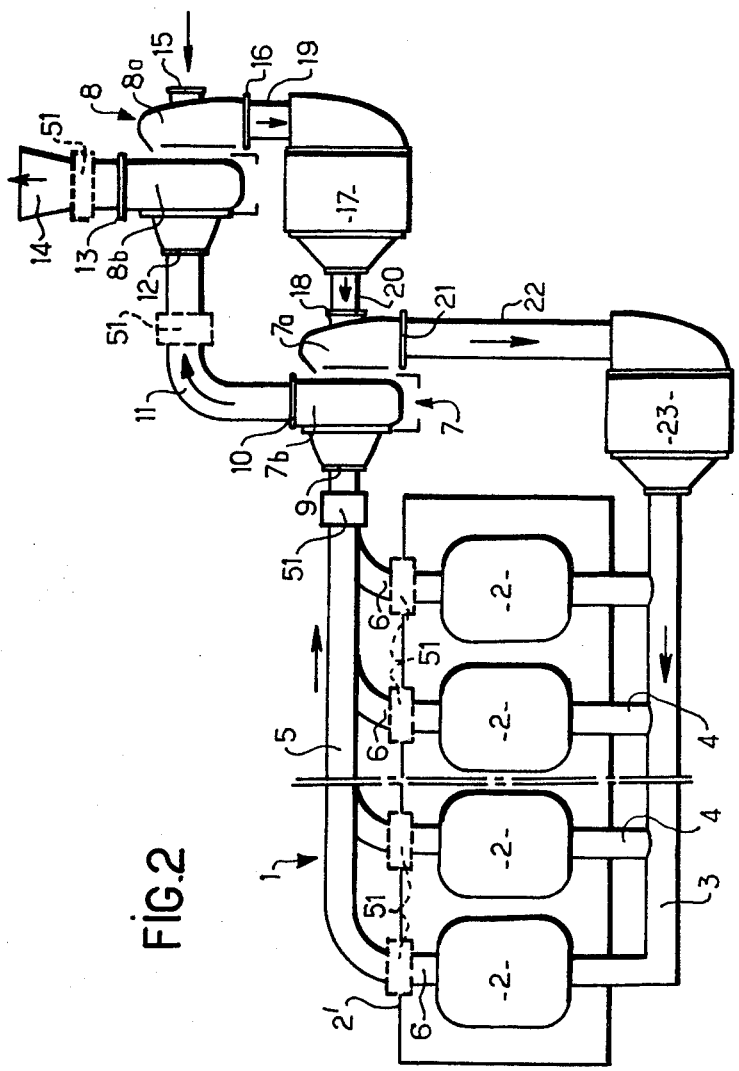

The invention will be better understood and other objects, characterizing features, details and advantages thereof will become apparent as the following explanatory description proceeds with reference to the accompanying diagrammatic drawings given by way of non-limiting examples only illustrating several presently preferred specific forms of embodiment of the invention and wherein:

FIG. 1 shows a partially sectional top view of a supercharged Diesel engine provided with almost all of the aforesaid forms of embodiment of the device according to the invention; and FIG. 2 is a similar but simplified view showing various modifications or alternative embodiments of the exhaust gas flow rate reducing means mounted at various locations of the exhaust gas flow path to illustrate multiple possibilities of practicing this principle of the invention.

Referring to the examplary embodiments shown in FIG. 1 of the drawings, the reference numeral 1 generally designates a Diesel engine with a plurality of cylinders 2, arranged for instance in line but which may be disposed according to any arrangement for example arranged in two V-shaped rows of cylinders. This engine comprises at least one air intake manifold 3 connected to the various cylinders, respectively, through branch-pipes 4 and at least one exhaust manifold 5 connected to the various cylinders, respectively, through branch-pipes 6. The engine 1 exhibits a relatively low volumetric compression ratio, i.e. lower than 12 (and for instance equal to 8.5) and it is in particular strongly supercharged (with a supercharging ratio for instance equal to or higher than 4) by one or several, in particular two Turbo-blower sets, namely a high-pressure turbo-blower 7 and a low-pressure turbo-blower 8. Each turbo-blower comprises an air booster or compressor 7a, 8a operatively connected mechanically to a drive turbine 7b, 8b driven by the exhaust gases. The inlet or ingress 9 of the high-pressure turbine 7b is connected to the downstream end portion or outlet of the exhaust manifold 5 whereas its outlet or egress 10 is connected through a connecting duct 11 to the inlet 12 of the low-pressure turbine 8b the outlet 13 of which opens to the open air for instance through the medium of a nozzle, funnel, chimney-stack or flue 14. The low-pressure air compressor 8a draws air in from the atmosphere through its inlet orifice 15 and discharges same through its outlet orifice 16 and through an interstage cooler 17 into the inlet or sucking orifice 18 of the high-pressure air compressor 7a through the medium of connecting ducts 19, 20 connecting the air inlet and outlet of the interstage air cooler 17 to the outlet 16 of compressor 8a and to the inlet 18 of compressor 7a, respectively. The air outlet 21 of compressor 7a is connected through a duct 22 to the inlet of an air aftercooler 23 the outlet of which is connected to the upstream end or inlet of the intake manifold 3. The intermediate or interstage air cooler 17 and the air aftercooler 23 consist each one of a heat exchanger through which a stream of coolant, for example of cooling liquid, is flowing through forced circulation. The guided path of travel of the coolant in each one of these heat exchangers consists of a piping arranged as coils or nests, bundles or clusters of tubes which is connected in series to a cold source of coolant which is advantageously liquid such as for instance water. This cold source may consist either of a ventilated radiator or of a coolat tank or of a local cold running water distribution system the fluid of which is discharged or delivered under pressure by pumping or through gravity. In the latter case, the hot water exiting from each air cooler 17, 23 may be either recovered by being returned to the cold source (for example to the tank) or rejected as a waste. Thus the respective coolant inlet and outlet pipes 24, 25 of the air cooler 17 are respectively connected in series through the feed and return ducts 26, 27 to the cold source 28. Likewise, the respective coolant inlet and outlet pipes 29, 30 of the air aftercooler 23 are respectively connected in series through the supply ducts 31, 31a and return ducts 32, 32a to the cold source 33.

The method according to a first embodiment of the invention for preheating the precompressed supercharging air fed into the intake manifold 3 when starting the engine from the standstill or when it is running at low-load operating conditions or with a reduced or slow rotational speed, consists in preheating the air when it is flowing through the air aftercooler 23 instead of cooling same therein. For this purpose the feed of cool fluid to the air aftercooler 23 is replced by a supply of hot fluid for example a hot liquid such as warm water so that the air cooler 23 is thus converted into an air heater. To this end the respective feed and return ducts 31, 32 desirably comprises each one a three-way valve 34, 35 between or across which are branched off in by-passing relationship on the one hand the cold source 33 through the respective supply and return ducts 31a, 32a and on the other hand a hot source 36 through the respective supply and return pipes 31b, 32b. This hot source 36 may consist for example either of a hot water generating boiler or of a hot steam generator or of a local hot water distribution system or main for supplying hot water under pressure for instance through pumping. By simultaneous operation of the valves 34, 35 in the proper direction either by manual actuation or by remote controlled servo-motors or like actuators, it is thus possible to connect at will the cooling circuit 29, 30 of the air aftercooler 23 successively or alternately in series either to the cold water source 33 for cooling the supercharging air under normal operating conditions of the engine or to the hot fluid source 36 for preheating this supercharging air at the standstill of the engine before or during the start thereof or also during its operation under low load or at reduced rotation speed. When the cold water source 33 consists for instance of a ventilated radiator, the valve system 34, 35 could possibly be mounted in such a manner as to be able to connect the hot fluid source 36 in series to the cooling circuit 29, 30 of the air cooler 23 without disconnecting the latter from the radiator 33 which would thus be continuously mounted permanently in series within the cooling circuit, i.e. being constantly connected to the respective inlet and outlet pipes 29, 30 of the air cooler 23.

Another method of preheating the supercharging air according to the invention in particular at the start of the engine consists in the use of a fuel burner 37 mounted on or close to the intake manifold 3 so as to inject the hot combustion gas directly into the intake manifold 3 so that they may blend with the supercharging air therein in order to preheat the latter thereby.

The engine case or cylinder block 2' comprises as usual a cooling circuit for cooling the cylinders generally by means of a liquid such as water the respective inlet and outlet pipes 38, 39 of which are connected in series to an outer cold source 40 through respective supply and return ducts 41, 42. The cold source 40 may consist for example of a heat exchanger such as a ventilated radiator or of a cold water tank or also of a local cold running water distribution system or main delivering cold running water discharged or supplied under pressure by pumping or through gravity into the feed or supply duct 41. The hot water issuing from the pipe 39 may be either recovered and sent back to the cold source 40 or removed as a lost discharge or waste by means of the return line 42. For preheating the supercharging air supplied to the cylinders of the engine at the standstill before the start of the latter, another process according to the invention consists in passing a hot fluid through the cooling circuit 38, 39 of the engine instead of the stream of cold water usually employed in order to preheat the engine cylinders hence the supercharging air entering same. For this purpose, the pipes 38, 39 may be connected to the pipes 41, 42, respectively, through two three-way valves 43, 44, respectively, which are themselves connected in series through respective lines 45, 46 to a source 47 of hot fluid which may be either a liquid such as hot water or a gaseous fluid such as steam. In the former case the hot source 47 may be hot water generating boiler and in the latter case it may consist of a steam generator. Thus the respective cold and hot sources 40, 47 are connected in branched off relationship across both three-way valves 43, 44. By simultaneous actuation of these valves in the proper direction by means of a manual action or a remote-control through servo-motors or the like it is thus possible to connect at will the cooling circuit 38, 39 of the engine successively or alternately in series either to the cold water source 40 of the engine to cool the cylinders under normal operating conditions of the engine or to the hot fluid source 47 to preheat the engine at the standstill thereof before starting same. In the case in particular where the cold source 40 consists for instance of a ventilated cooling radiator, the system of valves 43, 44 could possibly be arranged so that it may connect the hot fluid source 47 in series to the cooling circuit 38, 39 of the engine without disconnecting the latter from the radiator 40 which would thus be continuously interconnected in series permanently in the cooling circuit, i.e. being constantly connected to the respective inlet and outlet pipes 38, 39.

Still another method according to the invention for temperarily preheating the supercharging air at the start or under low-load operation of the engine consists in braking, impeding or reducing the flow of exhaust gases by temporarily introducing an obstacle or head pressure loss generating means into the downstream or outlet portion of the exhaust manifold 5 or advantageously at the outlet of the high-pressure turbine 7b. This exhaust gas flow reducing means may consist of an element reducing or restricting the free cross-sectional passageway of flow and temporarily positioned or introduced into the duct 11 after the outlet 10 of the turbine 7b. This member reducing, restricting or throttling the free cross-sectional passage-way may consist of a valve or movable closing member such as a pivoting flap, or like choke or strangler 48 permanently mounted within the duct 11 or also of a movable damper formed with at least one calibrated restriction passage-way hole or the like. The effect of the one or of the other of these partial closing members is to cause the engine cylinders to be incompletely emptied or drained so as to leave or retain therein residual air heated by compression and which in turn preheats the supercharging air being fed into the cylinders. As soon as the engine begins to run this partial closure of the exhaust is removed for example by moving the flap 48 to its fully open position or by entirely withdrawing the restriction or damper 49 formed with a throttling hole.

The flap 48 or movable apertured damper 49 may of course be located either before or upstream of the turbine 7b or at any location within the duct 11 or also after or downstream of the turbine 8b at the outlet 14 thereof.

According to the illustrative example shown in FIG. 2 of the drawings, the member 51 for selectively controlling the flow rate of the exhaust gases, which may consist for instance either of a rotary valve member such as the throttle means 48 shown in FIG. 1 or of a movable damper 49 formed with a calibrated thoroughfare hole 49 also shown in FIG. 1, is inserted, according to a possible form of embodiment, within the downstream end of the exhaust manifold 5 of the engine where this control member 51 has been symbolically shown in solid lines by a rectangular block.

According to a further possible form of embodiment the control member 51 may be interposed within one and preferably each one of the branch-pipes 6 connecting the cylinders 2 of the engine 1, respectively, to their associated exhaust manifold 5 as shown in broken or phantom lines by rectangular blocks inserted at an intermediate point of each exhaust branch-pipe 6, respectively.

According to still another possible form of embodiment the control member 51 may be placed at the outlet 13 or towards the discharge opening 14 of the last turbine 8b driving the air compressor 8a of the supercharging turbo-blower set 8 or between two such successive turbines mounted in series, namely in the duct 11 connecting the outlet 10 of the upstream turbine 7b driving the air compressor 7a of the first supercharging turbo-blower set 7 to the inlet opening 12 of said second turbine 8b as shown in broken or phantom lines by rectangular blocks, respectively, in the drawing.

Finally a further method according to the invention for temporarily preheating the supercharging air or the engine at the start thereof or when operating same under low-load conditions consists as shown in FIG. 1 in surrounding the engine 1 by a closed enclosure 50 consisting of the wall of a closed envelope such as a room, chamber or like compartment provided with means (not shown) for heating said enclosure, i.e. the ambient air confined thereby and bathing the engine 1. The engine is thus heated through convection by this environmental hot atmosphere in particular before its start and then this heating may be discontinued.

These various temporary preheating means may of course be used either separately, that is each one alone, individually and independently of the other ones, i.e. one only present at a time on the engine or in any possible combinations with at least some of these means which are simultaneously present. Automatic feed-back control, regulating, follow-up or phase-locking means may also be provided to act individually upon each one or at least some of these means for keeping them at least partially in operative working condition by modulating or adjusting their action according to the actual or instant operating conditions of the engine.

Instead of using several (for instance two) supercharging turbo-blowers connected in series as in the illustrative embodiment shown it is of course possible to make use of one single turbo-blower only the air booster of which comprises for example several compression stages and the turbine of which possibly comprises several expansion stages.

At start the engine 1 may be cranked by a starter for example pneumatically or electrically powered.

It should be understood that the invention is not at all limited to the forms of embodiment described and shown which have been given by way of example only. In particular it comprises all the means constituting technical equivalents of the means described as well as their combinations if same are carried out according to its gist and used within its scope as defined by the appended claims.

What is claimed is:

1. A method for at least temporarily heating the precompressed intake air of a supercharged, low compression ratio, internal combustion engine at start and low-load operating conditions, said method comprising the step of at least temporarily pre-heating said intake air before it is used to support combustion for burning fuel in the cylinder, wherein the improvement comprises initially cranking the engine from the stopped condition while temporarily delaying any fuel injection into at least one cylinder for at least one part of the starting time period of the engine and at the same time selectively impeding the exhaust gas streaming from said at least one cylinder for retaining a controlled amount of residual working gases in said at least one cylinder.

2. A method according to claim 1, wherein said flow rate reduction is produced between at least one engine cylinder and its associated exhaust manifold communicating therewith.

3. A method according to claim 1, wherein said flow rate reduction is produced towards the downstream end portion of at least one exhaust manifold on either side of at least one drive turbine of supercharging turbo-blower means.

4. A method according to claim 1, comprising the additional step of cranking said engine for its starting time period by drivingly rotating same mechanically through its crank-shaft for a small number of working cycles corresponding to about ten compressions, i.e. twenty revolutions in the case of a four-stroke engine without injecting fuel.

5. A method according to claim 1, comprising the additional step of automatically keying and phase-locking the fuel-injection time delay in follow-up relationship to the instant temperature of the preheated intake air.

6. A method according to claim 1, comprising the step of selectively injecting fuel substantially directly into at least one intake manifold of said engine and burning said fuel therein to produce hot combustion gases and thus mixing the latter directly with the supercharging intake air fed into said intake manifold.

7. A method according to claim 1, for an engine the supercharging precompressed air of which is normally cooled before its induction through forced circulation of a guided flow of an auxiliary cooling fluid, comprising the step of selectively replacing said cooling fluid by an auxiliary heating fluid.

8. A method according to claim 6, for an engine the supercharging air of which is normally cooled before its induction through forced circulation of a guided flow of an auxiliary cooling fluid, comprising the step of selectively replacing said cooling fluid by an auxiliary heating fluid.

9. A method according to claim 1, for an engine with cylinders cooled by forced circulation of a guided flow of an auxiliary coolant, comprising the step of selectively replacing said coolant by an auxiliary heating fluid.

10. A method according to claim 8, for an engine with cylinders cooled by forced circulation of a guided flow of an auxiliary coolant, comprising the step of selectively replacing said coolant by an auxiliary heating fluid.

11. A method according to claim 7, for an engine with cylinders cooled by forced circulation of a guided flow of an auxiliary coolant, comprising the step of selectively replacing said coolant by an auxiliary heating fluid.

12. A method according to claim 8, for an engine with cylinders cooled by forced circulation of a guided flow of an auxiliary coolant, comprising the step of selectively replacing said coolant by an auxiliary heating fluid.

13. A method according to claim 1, comprising the step of selectively confining and heating the ambient air of the environment surrounding said engine.

14. A method according to claim 6, comprising the step of selectively confining and heating the ambient air of the environment surrounding said engine.

15. A method according to claim 7, comprising the step of selectively confining and heating the ambient air of the environment surrounding said engine.

16. A method according to claim 8, comprising the step of selectively confining and heating the ambient air of the environment surrounding said engine.

17. A method according to claim 9, comprising the step of selectively confining and heating the ambient air of the environment surrounding said engine.

18. A method according to claim 10, comprising the step of selectively confining and heating the ambient air of the environment surrounding said engine.

19. A method according to claim 11, comprising the step of selectively confining and heating the ambient air of the environment surrounding said engine.

20. A method according to claim 12, comprising the step of selectively confining and heating the ambient air of the environment surrounding said engine.

21. A method according to claim 1, comprising the step of selectively injecting fuel substantially directly into at least one intake manifold of said engine and burning said fuel therein to produce hot combustion gases and thus mixing the latter directly with the supercharging intake air fed into said intake manifold.

22. A method according to claim 21, for an engine the supercharging air of which is normally cooled before its induction through forced circulation of a guided flow of an auxiliary cooling fluid, comprising the step of selectively replacing said cooling fluid by an auxiliary heating fluid.

23. A method according to claim 21, for an engine with cylinders cooled by forced circulation of a guided flow of an auxiliary coolant, comprising the step of selectively replacing said coolant by an auxiliary heating fluid.

24. A method according to claim 22, for an engine with cylinders cooled by forced circulation of a guided flow of an auxiliary coolant, comprising the step of selectively replacing said coolant by an auxiliary heating fluid.

25. A method according to claim 21, comprising the step of selectively confining and heating the ambient air of the environment surrounding said engine.

26. A method according to claim 22, comprising the step of selectively confining and heating the ambient air of the environment surrounding said engine.

27. A method according to claim 23, comprising the step of selectively confining and heating the ambient air of the environment surrounding said engine.

28. A method according to claim 24, comprising the step of selectively confining and heating the ambient air of the environment surrounding said engine.

29. A method according to claim 1, for an engine the supercharging air of which is normally cooled before its induction through forced circulation of a guided flow of an auxiliary cooling fluid, comprising the step of selectively replacing said cooling fluid by an auxiliary heating fluid.

30. A method according to claim 29, for an engine with cylinders cooled by forced circulation of a guided flow of an auxiliary coolant, comprising the step of selectively replacing said coolant by an auxiliary heating fluid.

31. A method according to claim 29, comprising the step of selectively confining and heating the ambient air of the environment surrounding said engine.

32. A method according to claim 30, comprising the step of selectively confining and heating the ambient air of the environment surrounding said engine.

33. A method according to claim 1, for an engine with cylinders cooled by forced circulation of a guided flow of an auxiliary coolant, comprising the step of selectively replacing said coolant by an auxiliary heating fluid.

34. A method according to claim 33, comprising the step of selectively confining and heating the ambient air of the environment surrounding said engine.

35. A method according to claim 1, comprising the step of selectively confining and heating the ambient air of the environment surrounding said engine.

36. A method according to claim 1, comprising the step of automatically keying or through servo-control said preheating step to the actual and instant operating conditions of said engine so as to vary the temperature of the supercharging air as the inverse ratio of the instant rotational speed of said engine and according to the pressure of said air.

37. A device for at least temporarily pre-heating the air supply for a supercharged low-compression ratio internal combustion engine provided by at least one exhaust gas-driven turbo-blower set, wherein the improvement comprises means for temporarily delaying any fuel injection into at least one low-compression cylinder for at least one part of the starting time period of the engine during initial cranking from a stopped condition and means for impeding exhaust gas streaming from said at least one low-compression cylinder for at least partially retaining a controlled amount of residual working gases in said at least one of the low-compression cylinders of said engine.

38. Device for at least temporarily pre-heating the air supply for a supercharged low-compression ratio internal combustion engine at start and low-load conditions, including at least one exhaust gas-driven turbo-blower set, wherein the improvement comprises means for temporarily delaying any fuel injection into at least one cylinder for at least one part of the starting time period of the engine during initial cranking from a stopped condition and a selectively adjustable control member mounted in the exhaust gas duct system at a position for impeding exhaust gas streaming from said at least one low-compression cylinder for at least partially retaining a controlled amount of residual working gases in said at least one of the low-compression cylinders, said control member being located at any position between said at least one cylinder and the upstream end of the drive turbine of the supercharging turbo-blower set.

39. A device according to claim 38, wherein said control member is positioned in a branch-pipe connecting one engine cylinder to its associated exhaust manifold communicating therewith.

40. A device according to claim 38, wherein said control member is provided at some point lying towards the downstream end portion of at least one exhaust manifold on either side of at least one drive turbine of supercharging turbo-blower means.

41. A device according to claim 38, comprising selectively adjustable means for delaying the fuel injection.

42. A device according to claim 41, comprising self-acting control means for operating and triggering the fuel injection in time-delayed relationship and keyed and phaselocked in follow-up relationship to the instant temperature of the air contained within at least one working cylinder of said engine.

43. A device according to claim 38, for an engine provided at least with supercharging air aftercooler means, comprising fuel burning means mounted on at least one intake manifold of said engine at a position located between the upstream inlet end portion of said intake manifold and some point towards the outlet of said aftercooler means.

44. A device according to claim 38, for an engine supercharged by at least one exhaust gas-driven turbo-blower set having at least supercharging air aftercooler means the inner coolant piping of which within the heat exchanger forming said aftercooler means is mounted in series in the circuit of a cold source of coolant, comprising a circuit of a hot source of heating fluid branched off across said piping in by-passing relationship through the medium of selectively controllable switching valve means for successively connecting said piping in series to and disconnecting it from said circuit of said hot source of heating fluid.

45. A device according to claim 43, for an engine supercharged by at least one exhaust gas-driven turbo-blower set having at least supercharging air aftercooler means the inner coolant piping of which within the heat exchanger forming said aftercooler means is mounted in series in the circuit of a cold source of coolant, comprising a circuit of a hot source of heating fluid branched off across said piping in by-passing relationship through the medium of selectively controllable switching valve means for successively connecting said piping in series to and disconnecting it from said circuit of hot source of heating fluid.

46. A device according to claim 38, for an engine with a cooling fluid circuit for cooling the engine cylinders, wherein said cooling fluid circuit comprises selectively controllable switching valve means connected to a circuit of a hot source of heating fluid for successively connecting said cooling fluid circuit directly in series to and disconnecting it from said circuit of said hot source of heating fluid.

47. A device according to claim 43, for an engine with a cooling fluid circuit for cooling the engine cylinders, wherein said cooling fluid circuit comprises selectively controllable switching valve means connected to a circuit of a hot source of heating fluid for successively connecting said cooling fluid circuit directly in series to and disconnecting it from said circuit of said hot source of heating fluid.

48. A device according to claim 47, for an engine with a cooling fluid circuit for cooling the engine cylinders, wherein said cooling fluid circuit comprises selectively controllable switching valve means connected to a circuit of a hot source of heating fluid for successively connecting said cooling fluid circuit directly in series to and disconnecting it from said circuit of said hot source of heating fluid.

49. A device according to claim 45, for an engine with a cooling fluid circuit for cooling the engine cylinders, wherein said cooling fluid circuit comprises selectively controllable switching valve means connected to a circuit of a hot source of heating fluid for successively connecting said cooling fluid circuit directly in series to and disconnecting it from said circuit of said hot source of heating fluid.

50. A device according to claim 38, comprising an enclosure surrounding said engine and provided with means for heating and receiving hot air.

51. A device according to claim 43, comprising an enclosure surrounding said engine and provided with means for heating and receiving hot air.

52. A device according to claim 44, comprising an enclosure surrounding said engine and provided with means for heating and receiving hot air.

53. A device according to claim 45, comprising an enclosure surrounding said engine and provided with means for heating and receiving hot air.

54. A device according to claim 46, comprising an enclosure surrounding said engine and provided with means for heating and receiving hot air.

55. A device according to claim 47, comprising an enclosure surrounding said engine and provided with means for heating and receiving hot air.

56. A device according to claim 48, comprising an enclosure surrounding said engine and provided with means for heating and receiving hot air.

57. A device according to claim 49, comprising an enclosure surrounding said engine and provided with means for heating and receiving hot air.

58. A device according to claim 82, for an engine provided at least with supercharging air aftercooler means, comprising fuel burning means mounted on at least one intake manifold of said engine at a position located between the upstream inlet end portion of said intake manifold and some point towards the outlet of said aftercooler means.

59. A device according to claim 58, for an engine supercharged by at least one exhaust gas-driven turbo-blower set having at least supercharging air aftercooler means the inner coolant piping of which within the heat exchanger forming said aftercooler means is mounted in series in the circuit of a cold source of coolant, comprising a circuit of a hot source of heating fluid branched off in by-passing relationship across said piping through the medium of selectively controllable switching valve means for successively connecting said piping in series to and disconnecting it from said circuit of said hot source of heating fluid.

60. A device according to claim 58, for an engine with a cooling fluid circuit for cooling the engine cylinders, wherein said cooling fluid circuit comprises selectively controllable switching valve means connected to a circuit of a hot source of heating fluid for successively connecting said cooling fluid circuit directly in series to and disconnecting it from said circuit of said hot source of heating fluid.

61. A device according to claim 59, for an engine with a cooling fluid circuit for cooling the engine cylinders, wherein said cooling fluid circuit comprises selectively controllable switching valve means connected to a circuit of a hot source of heating fluid for successively connecting said cooling fluid circuit directly in series to and disconnecting it from said circuit of said hot source of heating fluid.

62. A device according to claim 58, comprising an enclosure surrounding said engine and provided with means for heating and receiving hot air.

63. A device according to claim 59, comprising an enclosure surrounding said engine and provided with means for heating and receiving hot air.

64. A device according to claim 60, comprising an enclosure surrounding said engine and provided with means for heating and receiving hot air.

65. A device according to claim 61, comprising an enclosure surrounding said engine and provided with means for heating and receiving hot air.

66. A device according to claim 38, for an engine supercharged by at least one exhaust gas-driven turbo-blower set having at least supercharging air aftercooler means the inner coolant piping of which within the heat exchanger forming said aftercooler means is mounted in series in the circuit of a cold source of coolant, comprising a circuit of a hot source of heating fluid branched off in by-passing relationship across said piping through the medium of selectively controllable switching valve means for successively connecting said piping in series to and disconnecting it from said circuit of said hot source of heating fluid.

67. A device according to claim 66, for an engine with a cooling fluid circuit for cooling the engine cylinders, wherein said cooling fluid circuit comprises selectively controllable switching valve means connected to a circuit of a hot source of heating fluid for successively connecting said cooling fluid circuit directly in series to and disconnecting it from said circuit of said hot source of heating fluid.

68. A device according to claim 66, comprising an enclosure surrounding said engine and provided with means for heating and receiving hot air.

69. A device according to claim 67, comprising an enclosure surrounding said engine and provided with means for heating and receiving hot air.

70. A device according to claim 38, for an engine with a cooling fluid circuit for cooling the engine cylinders, wherein said cooling fluid circuit comprises selectively controllable switching valve means connected to a circuit of a hot source of heating fluid for successively connecting said cooling fluid circuit directly in series to and disconnecting it from said circuit of said hot source of heating fluid.

71. A device according to claim 70, comprising an enclosure surrounding said engine and provided with means for heating and receiving hot air.

72. A device according to claim 38, comprising an enclosure surrounding said engine and provided with means for heating and receiving hot air.

73. A device according to claim 38, further comprising automatic follow-up and servo-control means for keying and phase-locking the means for operating and controlling the supercharging air preheating means according to the actual and instant operating conditions of said engine.

74. A device according to claim 38, wherein said selectively adjustable flow rate control member is a rotary throttle valve element.

75. A device according to claim 38, wherein said selectively adjustable flow rate control member is a swing flap element.

76. A device according to claim 38, wherein said selectively adjustable flow rate control member is a sliding damper element formed with at least one calibrated thoroughfare passageway hole.

77. A method of at least temporarily assisting and promoting the ignition conditions at the start of a cold supercharged low-compression ratio Diesel engine in particular by raising the final compression temperature through at least partially withholding a controlled amount of residual working gases in each cylinder by selectively impeding the exhaust gas streaming therefrom and reducing the exhaust gas flow rate through artificial pressure loss generation in the flow path of said exhaust gases between each engine cylinder and an exit where said exhaust gases are discharged to the outside, in order to raise the back-pressure on said exhaust gas coming from said cylinder thereby increasing the residual gas content therein, wherein the improvement comprises, in the case of a highly supercharged Diesel engine, the steps of: initially cranking said engine from the stopped condition while temporarily delaying any fuel injection into its cylinders for at least one part of the starting time period of the engine and at the same time restraining and hindering said exhaust flow therefrom, cranking said engine for its starting period by drivingly rotating the same mechanically through its crank shaft for a small number of operating cycles corresponding to about ten compressions, i.e., twenty revolutions for a four-stroke engine without injecting fuel so as to drive said engine for several operating cycles without any ignition and combustion therein and with each cylinder being only filled and working with pure precompressed air drawn therein and exhausted therefrom so that said cylinders be incompletely emptied and scavenged, thereby causing air to at least partially remain and be retained and heated up through further compression within each cylinder and thus to supply and give off heat to the incoming fresh air charge sucked in; then after said engine has thus been warmed up to some extent, allowing fuel to be injected into each cylinder at the end of each compression stroke and to be burnt therein; and restoring free unimpeded exhaust gas flow conditions as soon as the engine has started and begun to run by itself.

* * * * *

UNITED STATES PATENT AND TRADEMARK OFFICE
CERTIFICATE OF CORRECTION

PATENT NO. : 4,096,697
DATED : 27 June 1978
INVENTOR(S) : Bernard Treuil

It is certified that error appears in the above-identified patent and that said Letters Patent are hereby corrected as shown below:

Column 1, line 53: change "now" to --not--.
Column 2, line 18: change "chamber" to --chambers--.
Column 3, line 66: change "conbinations" to --combinations--.
Column 4, line 68: change "after-cooler" to --aftercooler--.
Column 6, line 18: change "Turbo-blower" to --turbo-blower--.
Column 6, line 51: change "coolat" to --coolant--.
Column 7, line 5: change "replced" to --replaced--.
Column 7, line 9: change "comprises" to --comprise--.
Column 7, line 44: change "gas" to --gases--.
Column 8, line 30: change "temperarily" to --temporarily--.
Column 12, line 22: after "keying" delete --or--.
Column 13, line 36: before "hot" insert --said--.

Signed and Sealed this

Twenty-seventh Day of February 1979

[SEAL]

Attest:

RUTH C. MASON
Attesting Officer

DONALD W. BANNER
Commissioner of Patents and Trademarks